United States Patent [19]

Andersson et al.

[11] Patent Number: 4,528,608

[45] Date of Patent: Jul. 9, 1985

[54] ELECTRONIC CURRENT INTERRUPTER INCLUDED IN A DC DISTRIBUTION SYSTEM

[75] Inventors: Hans O. V. Andersson, Sollentuna; Kjell D. Rundkvist, Norsborg; Per E. Samsioe, Sollentuna, all of Sweden

[73] Assignee: Telefonaktiebolaget LM Ericsson, Stockholm, Sweden

[21] Appl. No.: 552,043

[22] PCT Filed: Jan. 27, 1983

[86] PCT No.: PCT/SE83/00026

§ 371 Date: Oct. 13, 1983

§ 102(e) Date: Oct. 13, 1983

[87] PCT Pub. No.: WO83/03035

PCT Pub. Date: Sep. 1, 1983

[30] Foreign Application Priority Data

Feb. 18, 1982 [SE] Sweden ............................. 8201003

[51] Int. Cl.³ ............................................ H02H 3/087
[52] U.S. Cl. ........................................ 361/18; 361/58; 361/94; 361/98; 361/101; 323/278
[58] Field of Search ................... 361/18, 58, 93, 94, 361/98, 101; 323/908, 278

[56] References Cited

U.S. PATENT DOCUMENTS

| | | | |
|---|---|---|---|
| 3,113,260 | 12/1963 | Wiley | 323/278 |
| 3,209,205 | 9/1965 | Olson | 361/101 |
| 3,558,982 | 1/1971 | Greenwood | 361/58 |
| 3,624,490 | 11/1971 | Fisher | 361/101 |
| 3,703,679 | 11/1972 | Heidt | 323/278 |
| 3,899,718 | 8/1975 | Schafe | 361/98 |
| 3,903,475 | 9/1975 | Mokrani et al. | 361/58 |

Primary Examiner—Patrick R. Salce
Attorney, Agent, or Firm—Roberts, Spiecens and Cohen

[57] ABSTRACT

An electronic current interrupter included in a DC distribution system contains a transistorized power circuit (EK), a threshold circuit (JF), a time circuit (TK) and holding circuit (HK). In one embodiment, the power circuit comprises a power transistor (T1) connected in series with the load and with a resistor (R1) in the threshold circuit. There is a current-limiting path containing a transistor (T2) and a current-limiting resistor (R4) in parallel with a power transistor (T1). When the load current exceeds a given value, the threshold circuit sends a voltage blocking the power transistor (T1) simultaneously as the transistor (T2) in the current-limiting path becomes conductive. After a given time (t), determined by the time circuit (TK), the holding circuit sends a voltage which also blocks the transistor (t2) in the current-limiting path, and the power circuit (EK) becomes entirely non-conductive to the load current.

2 Claims, 6 Drawing Figures

ELECTRONIC CURRENT INTERRUPTER INCLUDED IN A DC DISTRIBUTION SYSTEM

TECHNICAL FIELD

The present invention relates to an electronic current interrupter included in a DC distribution system, particularly for telephone stations, and intended to replace fusible fuses and automatic fuses in such systems. More specifically, there is intended an electronic current interrupter which limits the short-circuiting current in the system.

BACKGROUND ART

When short-circuiting occurs in power distribution systems using conventional fuses very large short-circuit currents occur, these are serious transient over- and undervoltages as a result. In telephone stations, for example, undervoltages cause the cessation in the functioning in the electronics cease with the risk of long operational interruptions. Overvoltages carry the risk of destroying electronic circuits. It is already known, e.g. from Ericsson Review No. 4, 1974 page 120, to solve the problems occurring in short-circuiting by making the power system "high-ohmic". The appended FIG. 1 illustrates an example of such a high-ohmic system. The rectifier RL supplies a load L via a filter F, a fuse S1 and a cable K. A battery B with a voltage E emk and internal resistance $R_i$ is connected as a standby to the system. The fuses S2–S6 are connected to further, unillustrated loads. The high-ohmic situation in the system means that the resistances in the various circuits are distributed between battery and cable in the ratio of 1:10, for example. This means that the internal impedance $R_i$ of the battery and the line impedance of the cable K do not fall below certain values. For a 48 V system, for example, $R_i = 4.5$ m$\Omega$ and the cable resistance $R_K = 45$ m$\Omega$ in spite of this not being desirable from the point of view of losses. Due to the high-ohmic situation, the short-circuiting current occurring is therefore limited in this example to a maximum of 1000 A. This solution gives a voltage drop of max 4.5 V. in the distribution, even for a short circuit. Loads connected to fuses, i.e. to S2–S6, other than the short-circuiting load L can therefore be kept at an acceptable voltage level.

For a short circuit in the load L there is obtained a transient sequence at the point A (FIG. 1) illustrated in the accompanying FIG. 2. FIG. 2 shows in a diagram that the voltage falls rapidly at the short-circuiting instant, and is thereafter constant, to rise rapidly at the instant when the fuse S1 has melted. With a high-ohmic system according to the above (graph b) there is obtained a maximum voltage drop and a maximum voltage rise of about 4.5 V, respectively, at the short circuiting instant and when the fuse has melted. The curve plotted with a full line illustrates the sequence for a conventional relay system which is not high-ohmic, and the chain-dotted curve c the sequence when using an electronic current interrupter in accordance with the invention. The high-ohmic solution to the transient problem described above requires large batteries, however, and is therefore only possible in practice for large power distribution systems. In small systems with batteries of less than about 2000 Ah, very large capacitors are required to keep the transients between acceptable levels.

DISCLOSURE OF INVENTION

An object of the present invention is to provide an electronic current interrupter which limits the short-circuiting current, whereby voltage drops and transients during short-circuiting and fuse-blowing can be reduced to very low values.

The invention is thereby characterized as disclosed in the following claim 1.

With the proposed electronic interrupter, wholly or partially replacing the fuses S1-S6 in the accompanying FIG. 1, there is thus obtained an improved current limitation which is achieved in the known system with the aid of the high-ohmic dimensioning of battery and cable. The advantage of the current interrupter in accordance with the invention is that such dimensioning is no longer necessary, signifying a simplification of the system, and lower losses in it. By using the proposed current interrupter, current limitation for a short circuit can also be obtained in small power systems.

DESCRIPTION OF FIGURES

The invention will now be described in detail with reference to the appended drawings, where FIG. 1 schematically illustrates a high-ohmic power distribution system.

EMBODIMENTS

Figure 3:
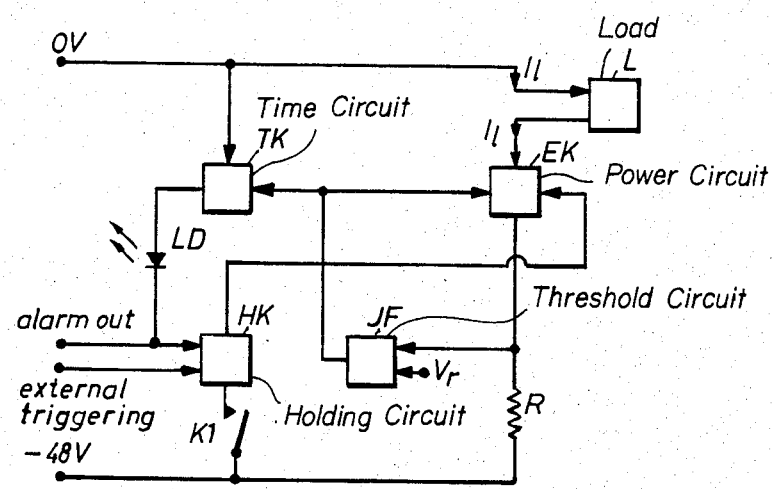
FIG. 3 is a block diagram illustrating the principle of the inventive current interrupter.

The block diagram of FIG. 3 illustrates the principle of an electronic current interrupter in accordance with the invention. It includes a power circuit EK connected to a load L, the short-circuit current of which is to be monitored. The load is connected to the system neutral conductor, and the power circuit EK is connected via a current-sensing resistor R to the negative pole in the system (−48 V in this case). The power circuit contains both a normally conductive and controllable current path and a controllable current-limiting current path, and is composed of transistor circuits, one of which allows the load current through and one which limits the overcurrent occurring for a short-circuit in the load to a given nominal value $I_n$. If the load L is capacitive, the power circuit also has the task of limiting the overcurrent occurring in the load during the starting sequence. In certain embodiments (described below) the controllable current path and the current limiting path may comprise one current path. The electronic current interrupter further includes a threshold circuit JF connected by one input to a resistor R and by its other input to a reference voltage $V_r$. The output of the threshold circuit JF is connected to a time circuit TK, the output of which is connected to the control input of a holding circuit HK via a visual indication means, e.g. a light-emitting diode LD. The output of the holding circuit is connected to the control input of the controllable current path incorporated in the power circuit EK. There is furthermore a contact K1 for resetting the holding circuit. The task of the holding circuit is to actuate the power circuit so that it does not conduct any current.

All the units (as well as the contact K1) are built up from electronic circuits including transistors, diodes and passive components (resistors, capacitors).

In the normal state, a load current $I \leq I_n$ flows through the power circuit conductive current path and through the resistor R. This gives a voltage drop $U_R < U_{ref}$, and no quantity is obtained across the output of the threshold circuit which can activate the time circuit TK. This circuit, as with the holding circuit HK, is thus in a rest state, and the load current flows without appreciable resistance (apart from the resistor R) from 0 V through the load and the power circuit EK to −48 V.

For a short-circuit or overcurrent $I > I_n$ and the voltage drop $U_R$ across the resistor R will be greater than $U_{ref}$. In this case an output quantity (output voltage) is obtained from the circuit JF, which is applied as a control quantity to the power circuit EK for controlling it into constant current regulation. This means that the short-circuiting current is limited to a value of the same order of magnitude as the nominal current value $I_n$ of the current interrupter. The time circuit TK is simultaneously activated by the output quantity from the threshold circuit JF and begins to establish a given selected time $\Delta t$. When the time $\Delta t$ has passed counted there is obtained an output signal to the LED and to the control input of the holding circuit HK. The latter then gives an output signal to the power circuit EK, resulting in that the current path (current paths) in it are interrupted, interrupting the load current completely. The delay sequence in the time circuit TK is necessary to prevent the electronic current interrupter from being triggered by individual transients which the power system can withstand, and for preventing the triggering of the current interrupter at the start of a capacitive load.

The holding circuit may possibly be dimensioned so that an external signal for "external triggering" activates it for activating the interrupter, i.e. achieving interruption of the load current. This gives the facility of arranging load priorities, e.g. for a network failure. The interrupter can be reset manually, or with the aid of an outside signal, by closing the contact K. The time circuit TK is suitably dimensioned as an analogue RC circuit (resistor plus capacitor) but a digital circuit solution with a binary counter can also be used.

Figure 4:
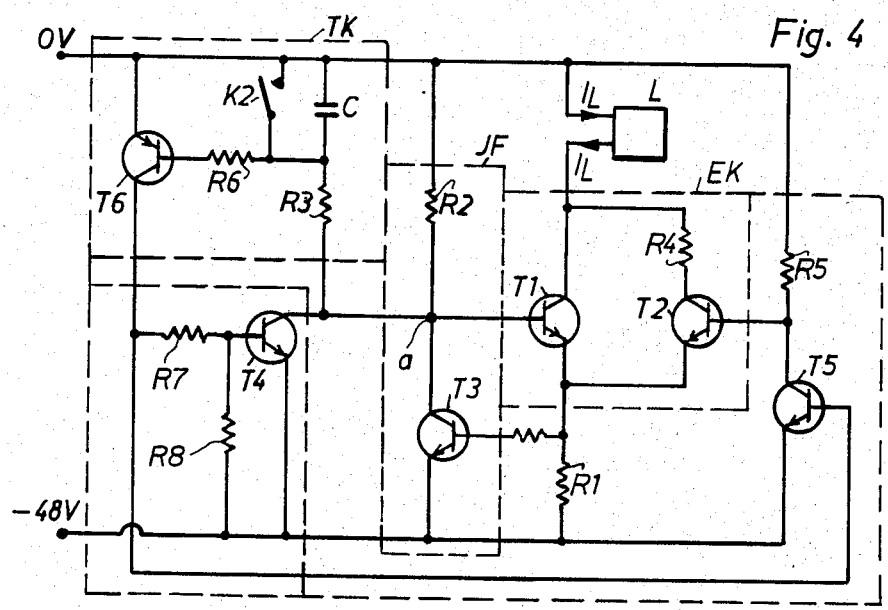
FIG. 4 is a circuit diagram of an embodiment in accordance with the invention.

FIG. 4 illustrates an embodiment of the electronic current interrupter in accordance with FIG. 3.

Figure 1:
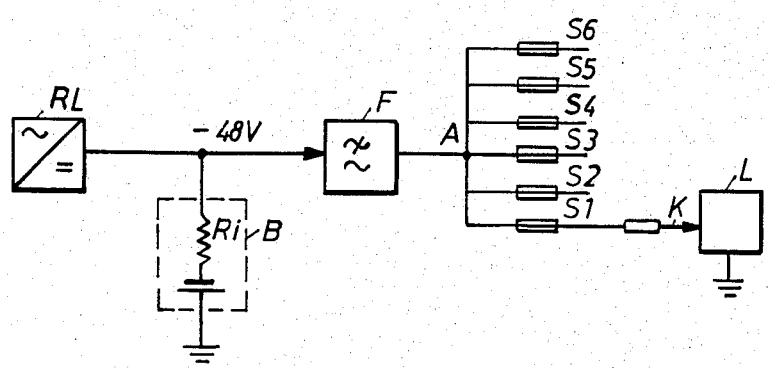
Figure 2:
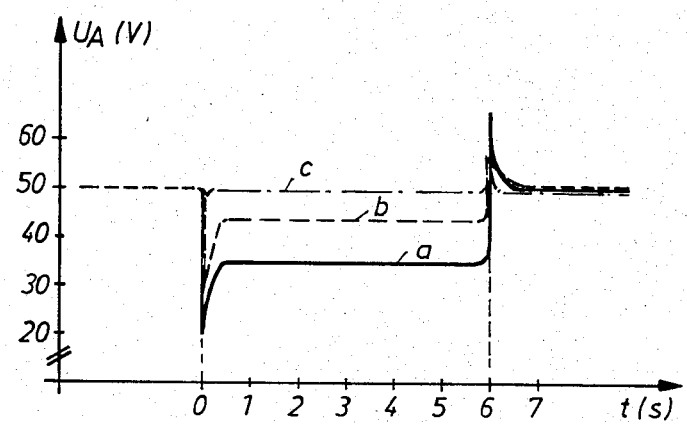
FIG. 2 is a diagram over the voltage drop across a fuse during short-circuiting.

The power circuit EK here has two current paths of which one constitutes the collector-emitter path in a first n-p-n transistor T1 and the second of a resistor R4 in series with the collector-emitter path of a second n-p-n transistor T2. The collector-emitter paths of the transistors T1 and T2 are connected in parallel. The resistor R1 connected to the emitters of the transistors T1 and T2 corresponds to the resistor R in FIG. 2. The comparator circuit JF is a n-p-n transistor T3, the base of which is connected via a resistor to the resistor R1 and to the common emitter connection point of the transistors T1 and T2. A resistor R2 is connected as collector resistance to the transistor T3. The time circuit TK includes an RC circuit containing an n-p-n transistor T6, an RC link comprising the capacitor C and resistor R3 together with a base resistor R6 for the transistor T6 connected between the capacitor C and resistor R3. A contact K2 is connected in parallel with the capacitor C for short-circuiting the latter when closed. The holding circuit HK has two transistor circuits. One circuit is formed by the n-p-n transistor T4, the base of which is connected to the collector of the transistor T6 in the time circuit TK, its collector being connected to the base of the transistor T1 incorporated in the power circuit. The second circuit comprises an n-p-n transistor T5, the resistor R5 being incorporated in the power circuit EK. The base of the transistor T5 is connected to the collector of the transistor T6, and its emitter (as with the emitter of the transistor T4) is connected to the −48 V terminal. The collector of the transistor T5 is connected to the terminal OV via the base resistor R5 of the transistor T2.

In the normal state of the power equipment, a load current $I_l < I_n$ flows to the collector of the transistor T1. The resistor R1 has a resistance dimensioned such that the base-emitter voltage drop of transistor T3 for the load current $I_l$ is less than 0.7 V, resulting in transistor T3 being blocked.

Furthermore, the resistance of the resistor R2 is such that sufficient base-emitter voltage drop of the transistor T1 is obtained, and the transistor T1 is thus completely conductive and a low-ohmic current path is obtained for the load current between the load output to −48 V.

When the load current $I_l$ increases so that $I_l > I_n$, i.e. an overcurrent occurs, as the result of a short circuit, for example, the voltage drop across the resistor R1 will increase up to the 0.7 V required for the transistor T3 to become conductive. The transistor T3 thus begins to be conductive and a current flows through the resistor R2 and the collector-emitter path of the transistor T3 to −48 V. This results in that the base current to the transistor T1 is drained off via the low-ohmic path to −48 V and the transistor T1 is blocked (the potential at the point a becomes negative). The short-circuiting current will then be conducted through the now conductive transistor T2 (base current via the resistor R5) and will be limited by the resistor R4. Current will also flow from 0 V to the capacitor C, through the resistor R3 in the time circuit and through the completely conductive transistor T3 to −48 V. This results in the capacitor C being charged (the contact K2 is open). After a given time $\Delta t$, the capacitor C has been charged so much that the base-emitter voltage drop to the transistor T6 exceeds 0.7 V and this transistor begins to be conductive, resulting in turn that current flows through the resistors R7, R8 and the transistor T5. Thus the current flowing via resistor R5 to the base of transistor T2 is switched to the collector-emitter circuit of transistor T5. The base-emitter voltage drop of the transistor T2 will now become too low, and this transistor becomes blocked. This means that the electronic current interrupter comes into function, since the load current path has been blocked by the non-conductive transistors T1 and T2. The current through the conductive transistor T5 is limited by the resistor R5.

Figure 6:
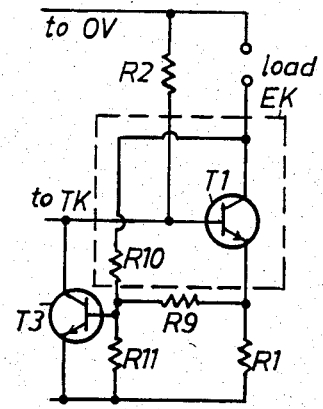

In the embodiment according to FIG. 6, the power circuit EK contains only one transistor T1, which, together with the resistor R1, forms a controllable current path for the load current. Via the resistor R10 included in the threshold circuit JF, the base of the transistor T3 is connected to the collector of the transistor T1 and to −48 V via the resistor R11. The transistor T2, the resistor R4, transistor T5 and resistor R5 (FIG. 4) have been removed. When the current through the transistor T1 increases, the transistor T3 will become conductive and the transistor T1 will begin to be blocked. The collector voltage across the transistor T1 thereby rises, and current flows through the resistor R10 to the base of the transistor T3. The more the voltage across the collector of transistor T1 increases the more this transistor is blocked. There is thus obtained a reduction of the collector-emitter current of the transistor T1 so that the product $V_{CE} \cdot I_c$ is obtained within the transistor's safe operating area. The result will be a limitation of the short-circuiting current and the short-circuiting power.

Figure 5:
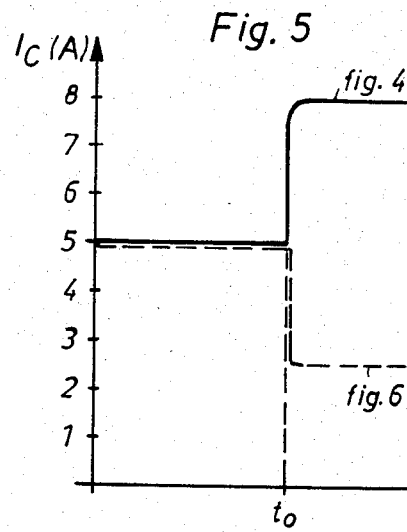
FIG. 5 is a current diagram and FIG. 6 illustrates an embodiment of the power circuit included in the current interrupter of FIG. 3.

The diagram of FIG. 5 illustrates the collector current through the transistor T1 (FIG. 4) as a function of time. A normal load current flows for t=0, e.g. a collector current of 5 A passes through the transistor T1. Short-circuiting in the load occurs for t=to and the current increases in jumps, but is limited by the power circuit to a given value, e.g. 8 A. This is accomplished with the aid of the current path R4, T2 according to FIG. 4. In the embodiment according to FIG. 6, the collector current $I_c$ is limited in dependence on the collector voltage and to a value lower than $I_n=5$ A (dashed graph).

We claim:

1. In a DC-distribution system having a supply source and a load and electronic current interruptor connected in series between the load and the supply source to operate when the load current through the interruptor exceeds a given value after a given time, comprising a current limiting power circuit comprising first transistor means for conducting the load current and second transistor means and current limiting means connected in parallel with the first transistor means, said first and second transistor means being unidirectional conducting in the same direction, means for controlling said first transistor means to switch from conductivity to non-conductivity when said load current exceeds a threshold value while said second transistor means remains conductive in order to limit the load current, a timing circuit being activated when the load current exceeds said threshold value for controlling second transistor means to become non-conductive after a predetermined time interval, and a holding circuit being activated when said second transistor means is rendered non-conductive and for maintaining said first transistor means non-conductive after said predetermined time interval has elapsed.

2. The electronic current interruptor of claim 1, wherein said first transistor means includes a threshold circuit sensitive to said threshold value, a first transistor having a collector-emitter path which conducts the load current, and a base of which is connected to said threshold circuit, and a second transistor having collector-emitter path in series with a first resistor to form current limiting means, and a base connected via a second resistor to one terminal of said supply source, the second resistor being dimensioned such that when the load current exceeds said threshold value and when the first transistor becomes non-conductive, the second transistor becomes conductive for limiting the load current.

* * * * *